(12) United States Patent
Speights

(10) Patent No.: US 10,398,125 B1
(45) Date of Patent: Sep. 3, 2019

(54) LAPTOP OR KEYBOARD SIMULATING PET BED

(71) Applicant: Jamaal Kinney Speights, Springfield, VA (US)

(72) Inventor: Jamaal Kinney Speights, Springfield, VA (US)

( * ) Notice: Subject to any disclaimer, the term of this patent is extended or adjusted under 35 U.S.C. 154(b) by 0 days.

(21) Appl. No.: 16/251,002

(22) Filed: Jan. 17, 2019

Related U.S. Application Data

(63) Continuation-in-part of application No. 14/969,827, filed on Dec. 15, 2015, now abandoned.

(51) Int. Cl.
| | |
|---|---|
| *A01K 1/03* | (2006.01) |
| *A01K 1/035* | (2006.01) |
| *G06F 3/01* | (2006.01) |
| *G06F 3/02* | (2006.01) |
| *A01K 1/00* | (2006.01) |

(52) U.S. Cl.
CPC .......... *A01K 1/0353* (2013.01); *A01K 1/0076* (2013.01); *G06F 3/016* (2013.01); *G06F 3/0219* (2013.01)

(58) Field of Classification Search
CPC .... A01K 1/0353; A01K 1/0076; G06F 3/016; H05B 1/02; H05B 1/0222
See application file for complete search history.

(56) References Cited

U.S. PATENT DOCUMENTS

| | | | | |
|---|---|---|---|---|
| 4,332,214 A * | 6/1982 | Cunningham | ....... | A01K 1/0353 119/28.5 |
| 5,055,053 A * | 10/1991 | Hyman | ...... | A63F 9/18 273/455 |
| 5,828,034 A * | 10/1998 | Chang | ...... | G06F 3/0202 219/209 |
| 6,084,209 A * | 7/2000 | Reusche | ...... | A01K 1/0218 219/212 |
| 6,189,487 B1 * | 2/2001 | Owen | ...... | A01K 1/0157 119/28.5 |
| 6,646,226 B1 * | 11/2003 | Reitz | ...... | G06F 3/0202 219/209 |
| 6,878,902 B2 * | 4/2005 | Lyle | ...... | G06F 1/1616 219/209 |
| 7,327,559 B2 * | 2/2008 | Fox | ...... | G06F 1/1616 219/209 |
| 8,242,412 B2 * | 8/2012 | Liu | ...... | G06F 3/0202 219/200 |
| 8,419,221 B2 * | 4/2013 | Chen | ...... | G06F 3/0202 219/209 |

(Continued)

*Primary Examiner* — Michael H Wang
(74) *Attorney, Agent, or Firm* — QuickPatents, LLC; Kevin Prince

(57) ABSTRACT

A bed for a pet comprises a computer keyboard simulating enclosure having a top side having a plurality of simulated computer keys, a bottom side adapted for laying on a horizontal surface, and a peripheral edge. A heating element is fixed within the enclosure and is adapted to heat at least the top side of the enclosure. A power conduit traversing the enclosure is adapted for connecting the heating element with a power source. The bed further includes pressure-activated switch for activating the heating element, a keyboard sound simulating device, an illumination device, a vibration device, and/or a simulated laptop display projecting away from a rear side of the enclosure.

8 Claims, 2 Drawing Sheets

(56) References Cited

U.S. PATENT DOCUMENTS

| | | | |
|---|---|---|---|
| 2005/0278863 A1* | 12/2005 | Bahash | A01K 1/0353 |
| | | | 5/726 |
| 2006/0005773 A1* | 1/2006 | Brown | A01K 1/0353 |
| | | | 119/28.5 |
| 2006/0112491 A1* | 6/2006 | Buehner | A01K 1/0157 |
| | | | 5/691 |
| 2006/0288949 A1* | 12/2006 | Axinte | A01K 1/0353 |
| | | | 119/169 |
| 2008/0022935 A1* | 1/2008 | Fine | A01K 1/0353 |
| | | | 119/28.5 |
| 2008/0283513 A1* | 11/2008 | Ferguson, III | A01K 1/0353 |
| | | | 219/217 |
| 2008/0295780 A1* | 12/2008 | Huang | A01K 1/033 |
| | | | 119/482 |
| 2014/0218303 A1* | 8/2014 | Kao | G06F 3/016 |
| | | | 345/168 |
| 2015/0034471 A1* | 2/2015 | Smith | H01H 13/85 |
| | | | 200/5 A |

* cited by examiner

LAPTOP OR KEYBOARD SIMULATING PET BED

CROSS-REFERENCE TO RELATED APPLICATIONS

This application is a Continuation-in-Part of U.S. Utility patent application Ser. No. 14/969,827, filed on Dec. 15, 2015, and incorporated herein by reference.

STATEMENT REGARDING FEDERALLY SPONSORED RESEARCH AND DEVELOPMENT

Not Applicable.

FIELD OF THE INVENTION

This invention relates to animal husbandry, and more particularly to a pet bed.

DISCUSSION OF RELATED ART

Pet owners, and owners of cats in particular, know that upon sitting down at a computer their pet frequently desires to lay directly on the computer keyboard. While pet owners frequently attribute this behavior to a desire for affection, or conversely to a desire to annoy the pet owner, more likely the draw of the keyboard has more to do with warmth and proximity to interesting activity.

Since people with pets sitting at a computer keyboard typically need to use the keyboard, there is a need for a device that simulates a keyboard but provides for greater warmth and for interesting sound, light and tactile effects to divert their pet. When positioned close to an actual computer keyboard, such a needed device would draw the pet away therefrom and would provide for many hours of warmth, comfort and entertainment of the pet away from the owner's actual computer activities. Such a device would be relatively simple to manufacture and use, and would be safe for use around both pets and children. The present invention accomplishes these objectives.

SUMMARY OF THE INVENTION

The present device is a bed for a pet that comprises a computer keyboard simulating enclosure having at least a top side, a bottom side adapted for laying on a horizontal surface, and a peripheral edge. The top side includes a plurality of simulated computer keys and may further include a fabric portion. A heating element is fixed within the enclosure and is adapted to heat at least the top side of the enclosure. A power conduit traversing the enclosure is adapted for connecting the heating element with a power source.

Preferably the bed further includes a pressure-activated switch between the power source and the heating element and fixed within the enclosure. The pressure-activated switch is adapted for closing when the weight of the pet is introduced to the top side of the enclosure to activate the heating element.

In one embodiment, the bed further includes a keyboard sound simulating device within the enclosure that, when active by the weight of the pet, produces a simulated keyboard typing sound. The bed may further include an illumination device within the enclosure that, when activated by the weight of the pet, produces at least one visible light within the enclosure. A vibration device may be further included within the enclosure that, when active by the weight of the pet, introduces a vibration to the enclosure.

In one embodiment, the bed includes a simulated laptop display projecting away from a rear side of the enclosure. Such a simulated laptop display may include the illumination device. Multiple such switches may be included at different areas of the bed, such that the pet triggers different sound, light, or tactile effects when shifting his weight on the bed.

The present invention is a device that simulates a keyboard or laptop but provides for greater warmth and for interesting sound, light and tactile effects. When positioned close to an actual computer keyboard, the present invention draws the pet away therefrom and provides for many hours of warmth, comfort and entertainment of the pet away from the owner's actual computer activities. The present invention is simple to manufacture and use, and is safe for use around both pets and children. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
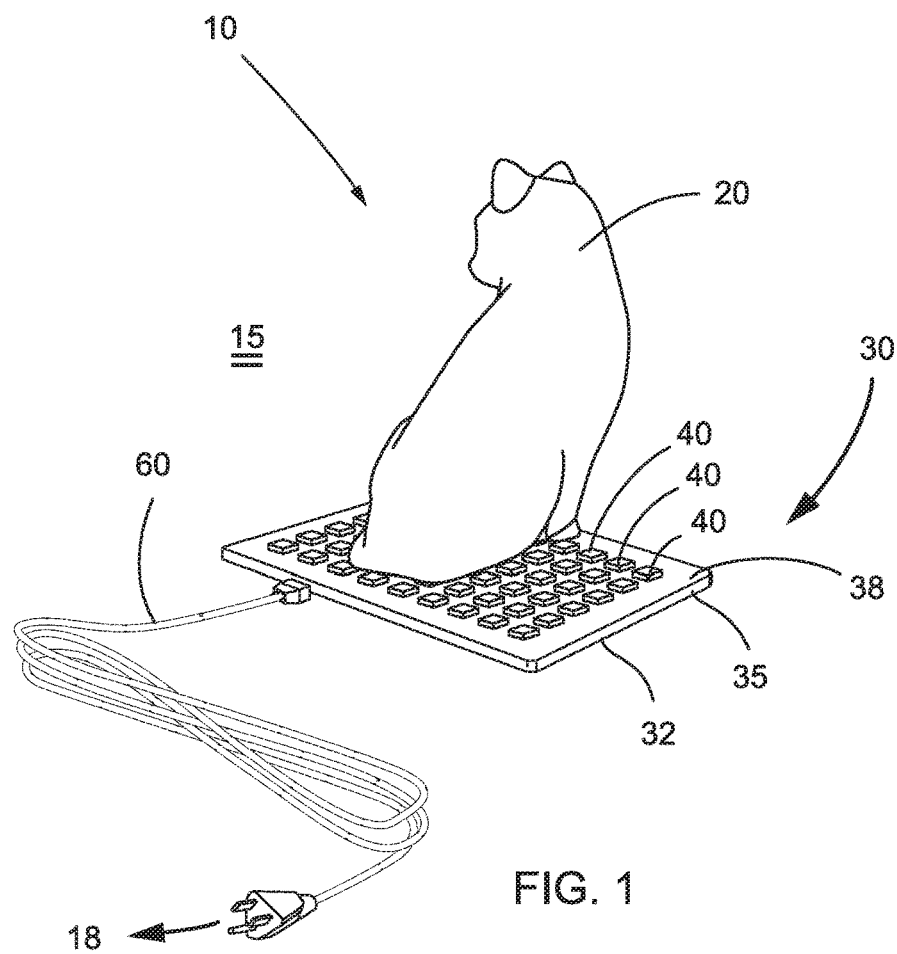
FIG. 1 is a front perspective view of one embodiment of the invention.
Figure 2:
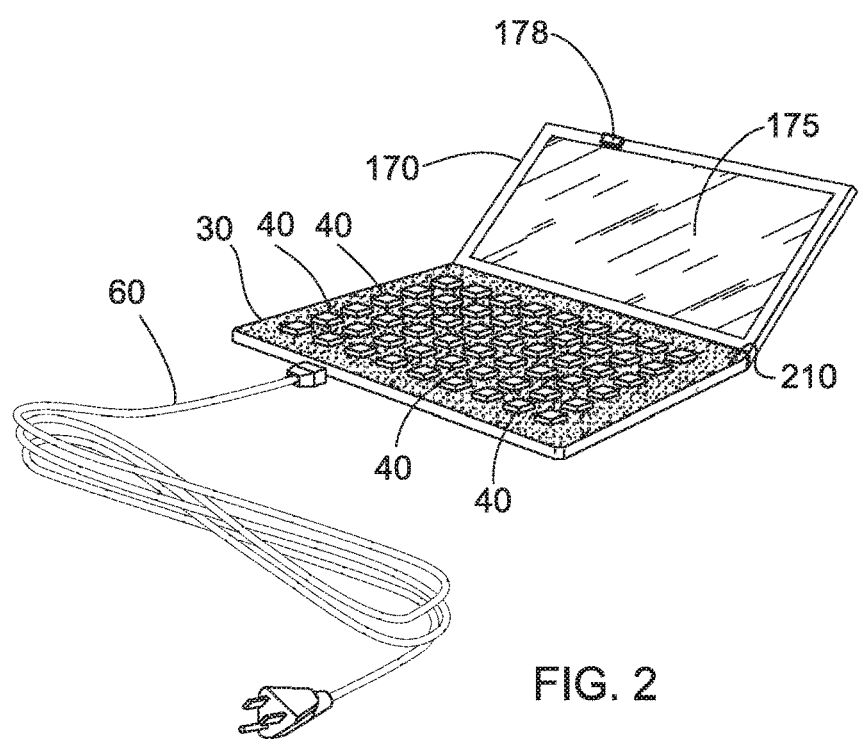
FIG. 2 is a front perspective view of an alternate embodiment of the invention.
Figure 3:
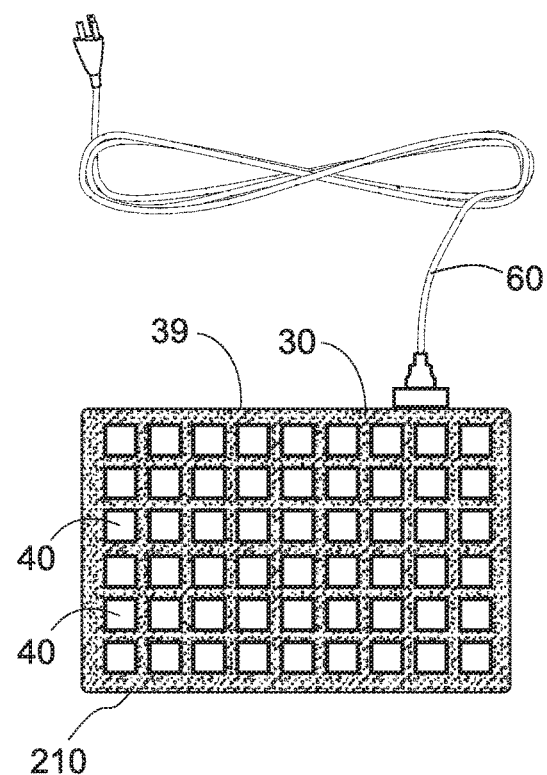
FIG. 3 is a top plan view of another alternate embodiment of the invention.

FIGS. 1-3 illustrate a bed 10 for a pet 20 resting on a substantially horizontal surface 15. The bed 10 comprises at least a computer keyboard simulating enclosure 30 having at least a top side 38, a bottom side 32 adapted for laying on the horizontal surface 15, and a peripheral edge 35. The top side 38 includes a plurality of simulated computer keys 40 projecting upwardly therefrom, and may further include a fabric portion 210 fixed with at least a part of the enclosure 30 to further aid in the comfort and warmth of the pet 20, and to provide a scratching surface for cats, for example. In some embodiments the simulated computer keys 40 each depress similar to the function of an actual computer key but not operable electrically as a computer key. In other embodiments the simulated computer keys 40 are fixed with and project upwardly from the enclosure 30.

A heating element 50 is fixed within the enclosure 30 and is adapted to heat at least the top side 38 of the enclosure 30. The heating element 50 may be an incandescent lamp (not shown), for example, a resistive heating element, or the like. The enclosure 30 is made from a material that is at least somewhat thermally transmissive and can withstand at least the temperatures produced by the heating element 50. A power conduit 60 traversing the enclosure is adapted for connecting the heating element 50 with a power source 18, such as a wall outlet (not shown), an AC adapter (not shown), or the like. However, the power conduit 60 is not adapted for connecting with a laptop or desktop computer USB or similar data port, as the ped bed 10 simulates only the visual appearance of a computer keyboard and is non-operable electronically as a computer keyboard.

Figure 4:
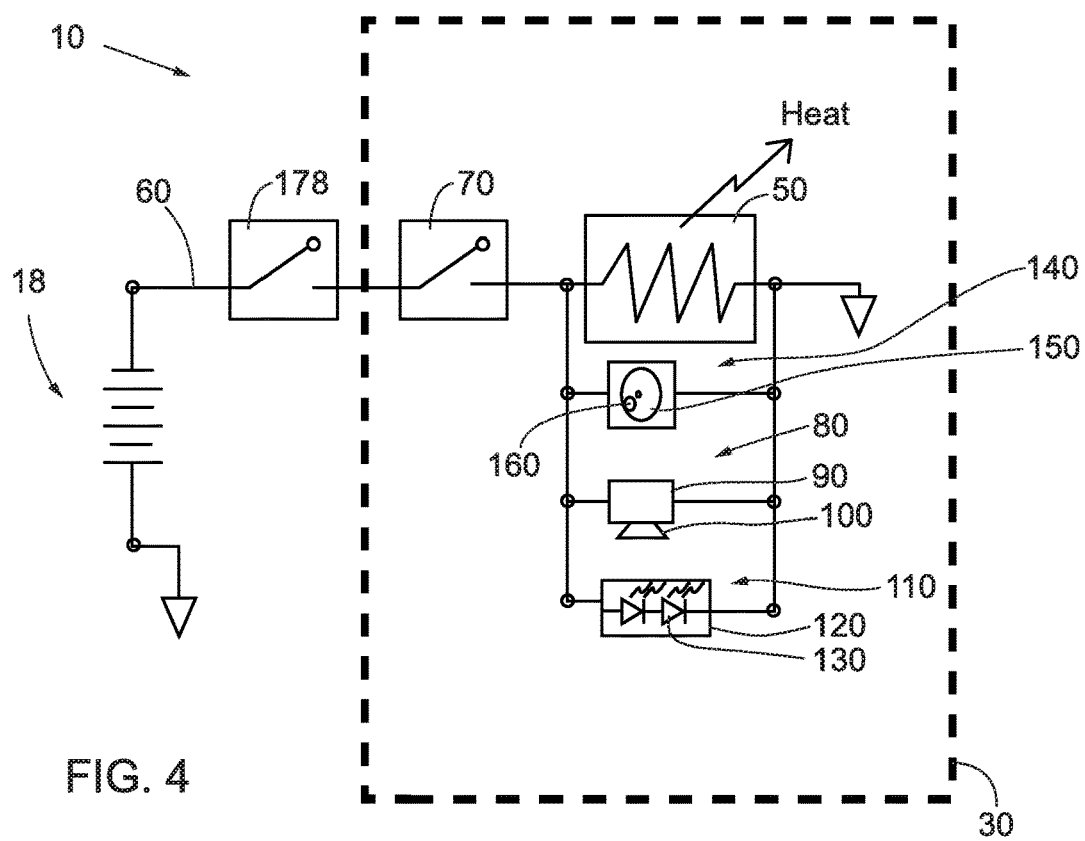
FIG. 4 is a schematic diagram of the invention.

The bed 10 further includes pressure-activated switch 70 (FIG. 4) between the power source 18 and the heating element 50 and fixed within the enclosure 30. The switch 70 is adapted for closing when the weight of the pet 20 is introduced to the top side 38 of the enclosure 30 to activate the heating element 50.

In one embodiment, the bed 10 further includes a keyboard sound simulating device 80 within the enclosure 30 that, when active by the weight of the pet 20, produces a simulated keyboard typing sound. In such an embodiment, the sound simulating device 80 is an audible playback circuit 90 that has an audible transducer 100 connected in parallel with the heating element 50 and active by the closing of the switch 70.

In one embodiment, the bed 10 further includes an illumination device 110 within the enclosure 30 that, when activated by the weight of the pet 20, produces at least one visible light within the enclosure 30. In such an embodiment, at least a portion of the enclosure 30 is made from a non-opaque material, such as translucent or transparent plastic material. The illumination device 110 may be a lamp circuit 120 that includes at least one LED 130 and that is connected in parallel with the heating element 50 and activated by the closing of the switch 70.

In one embodiment, the bed 10 further includes a vibration device 140 within the enclosure 30 that, when active by the weight of the pet 20, introduces a vibration to the enclosure 30. The vibration device 140 may be at least one motor 150 with an offset weight 160 that is connected in parallel with the heating element 50 and that is activated by the closing of the switch 70.

In one embodiment, the bed 10 includes a simulated laptop display 170 (FIG. 2) projecting away from a rear side 39 of the enclosure 30. Such a simulated laptop display 170 may include the illumination device 110 therein that, when activated by the weight of the pet 20, produces at least one visible light within the simulated laptop display 170. In such an embodiment at least a portion of the simulated laptop display 170 is made from a non-opaque material. The simulated laptop display 170 is non-operable as an actual laptop display (not shown). In such an embodiment, the pet bed 10 visually simulates a laptop computer (not shown), but is non-operable as a laptop computer or an auxiliary computer display.

The simulated laptop display 170 can be pivotally attached to the rear side 39 of the enclosure 30 and include a master power switch 178 (FIGS. 2 and 4) electrically disposed between the pressure switch 70 and the power source 18, so that if the simulated laptop display 170 is in a downward or closed position (not shown, but understood to be similar to the visual appearance of a conventional laptop computer in a closed position) the heating element 50 is off for safety. Further, the simulated laptop display 170 may include a partially reflective simulated screen 175. The simulated laptop display 170 can pivot with the enclosure 30 in a way mechanically similar to a conventional laptop.

While a particular form of the invention has been illustrated and described, it will be apparent that various modifications can be made without departing from the spirit and scope of the invention. For example, the simulated computer keys 40 may be projecting upwardly from the top side 38 of the enclosure 30, or may just be a graphic applied to the top surface 38. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A bed for a pet resting on a substantially horizontal surface, the bed comprising:
    a computer keyboard simulating enclosure having at least a top side, a bottom side adapted for laying on the substantially horizontal surface, and a peripheral edge, the top side of the enclosure including a plurality of simulated computer keys projecting upwardly therefrom, the plurality of simulated computer keys arranged in at least a plurality of rows;
    a heating element fixed within the enclosure and adapted to heat at least the top side of the enclosure, the heating element disposed within the enclosure between the top side, the bottom side and the peripheral edge such that the entire heating element is enclosed and concealed within the enclosure;
    a power conduit traversing the enclosure and adapted for connecting to a power source; and
    a pressure-activated switch fixed within the enclosure and connected with the power conduit and the heating element, the pressure-activated switch adapted to close when the weight of the pet is introduced to the top side of the enclosure, wherein when the pressure-activated switch is closed, power from the power source is provided by way of at least the power conduit and the pressure-activated switch to the heating element to activate the heating element;
    wherein the ped bed simulates the visual appearance of a computer keyboard and is non-operable electronically as a computer keyboard.

2. The bed of claim 1 further including a keyboard sound simulating device disposed within the enclosure and configured to be activated to produce a simulated keyboard typing sound when the weight of the pet is introduced to the top side of the enclosure.

3. The bed of claim 2 wherein the keyboard sound simulating device is an audible playback circuit that has an audible transducer, that is connected in parallel with the heating element and that is activated by closing of the pressure-activated switch when the weight of the pet is introduced to the top side of the enclosure.

4. The bed of claim 1 further including an illumination device disposed within the enclosure and configured to be activated to produce at least one visible light within the enclosure when the weight of the pet is introduced to the top side of the enclosure, the enclosure being at least partially made from a non-opaque material.

5. The bed of claim 4 wherein the illumination device is a lamp circuit that has at least one LED and that is connected in parallel with the heating element and that is activated by closing of one pressure-activated switch when the weight of the pet is introduced to the top side of the enclosure.

6. The bed of claim 1 further including a vibration device disposed within the enclosure and configured to be activated to produce a vibration to the enclosure when the weight of the pet is introduced to the top side of the enclosure.

7. The bed of claim 6 wherein the vibration device is at least one motor with an offset weight and that is connected in parallel with the heating element and that is activated by closing of the pressure-activated switch when the weight of the pet is introduced to the top side of the enclosure.

8. The bed of claim 1 further including a fabric portion fixed with at least a part of the enclosure.

* * * * *